J. H. Gill,
Hay Elevator.
Nº 19,087.    Patented Jan. 12, 1858.
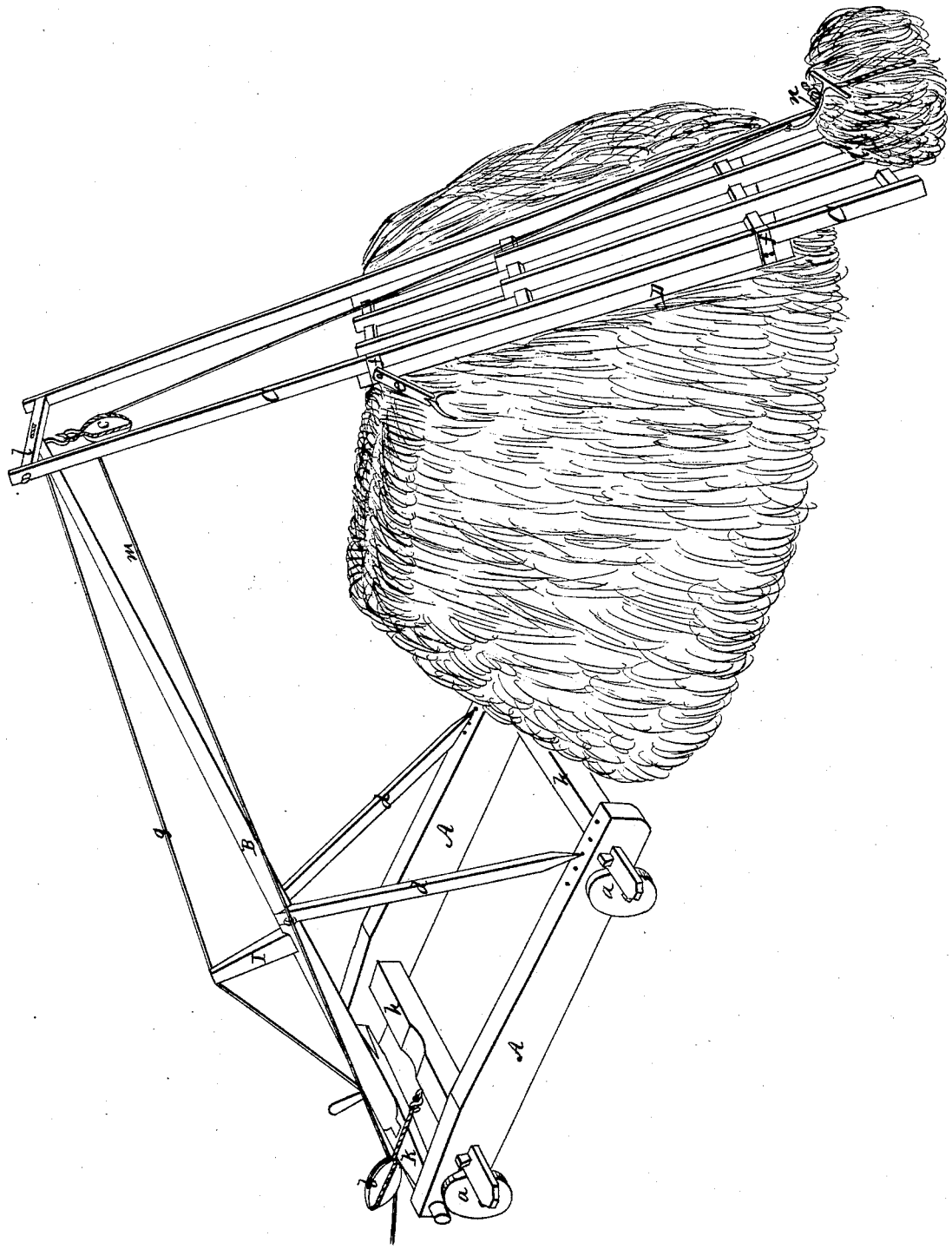

UNITED STATES PATENT OFFICE.

JAMES H. GILL, OF MOUNT PLEASANT, OHIO.

HAY AND STRAW ELEVATOR.

Specification of Letters Patent No. 19,087, dated January 12, 1858.

*To all whom it may concern:*

Be it known that I, JAMES H. GILL, of Mount Pleasant, in the county of Jefferson and State of Ohio, have invented certain new and useful Improvements in Hay and Straw Elevators, of which the following is a full, clear, and exact description, reference being had to the accompanying drawing, forming part of this specification, in which is representetd a perspective view of a hay and straw elevator embracing my improvements.

In the construction of elevators for farm purposes, they should be so arranged as to possess a general adaptability to the numerous situations and uses to which they can be applied with great advantage on a farm, be portable, durable, and simple in their construction so far as to be easily repaired when out of order.

Those heretofore constructed are deficient in some of these important particulars, and the object of my improvements in these machines is in a measure to overcome these defects.

My invention for effectng this object consists, first, in hinging the base of the boom which sustains the hoisting mechanism to a strong portable carriage, and combining with it an adjustable apron or fender which not only assists in sustaining the loom in an inclined position, but also serves to protect the bunches of hay and straw as they are elevated, and also the stack or rick while being formed from injury. Second, in giving support to the stationary section of the fender and also retaining the sliding section in position as it is raised and keeping it off from the stack so that it can be formed around it by means of forked holders hinged to the upper part of the sliding section.

In the accompanying drawing is represented an elevator embracing my improvements, and it consists of a strong frame (A) for the support of a hoisting boom (B), and an adjustable and sliding apron (C) which serves as a fender. The frame (A) is provided with wheels (a) which are only used in transporting the machine from place to place.

The boom (B) is tenoned at its lower end to a cross bar (k) which is pivoted to the sides of the framing so as to admit of the boom being raised and lowered; the mortise in the bar (k) is made wider than the tenon to admit of lateral motion in the boom, so that its position may be changed without moving the frame. Two braces (d) are pivoted to the side of the boom about midway of its length and form a horse for the support of the boom when raised in an inclined position; the feet of the horse rest in notches in the top of the frame to prevent their slipping. The boom is strengthened by a strong rod (g) passing over a king post (i) on its upper side, and confined at each end of the boom; this rod may be provided with a screw buckle if thought proper in order to tighten it. Girts (h) connect the two sides of the frame and extend beyond their face, and against the projections stakes may be driven to hold the frame in place and prevent its slipping.

The fender consists of a light stationary frame (C) and a sliding section (D). The side slats of the stationary part extend up and are pivoted to a cross bar (l) on the end of the boom, thus giving to it support at the point at which it is subjected to the greatest strain, and obviating the necessity of counterweighting the frame to prevent its tipping when heavy weights are raised. Guides (f) hold the sliding section (D) to the under side of the stationary (C) and admit of its being raised or lowered in order to bring the top of the fender above the top of the stack or cart. Forked feet (e) are hinged to the top of the sliding section and serve to hold the slide in position as it is raised, by resting against the top of the stack, thus prevent it from sliding back, and also support and stiffen the whole frame while it keeps it off from the stack and admits of the hay being packed and the stack finished around it.

Two pulley blocks (b, c) are confined to the boom; the one (c) at its outer end and the other (b) to its lower end or to the girt. A fall rope (m) is rove through the blocks and to its outer end is attached a gathering fork (n) similar in construction to a short handle rake with long curved teeth. The fall is worked by a horse harnessed to the opposite end.

In using the machine for stacking hay or straw, it is drawn to the place at which the stack is to be made, the wheels removed, the boom raised to an inclined position, and adjusted to the proper height by the supporting horse. The hay or straw to be stacked is made into bundles and drawn to the machine. Into these bundles the fork is hooked and dragged by the horse to the machine and up the inclined fender. When in the right position the horse is stopped, the bundles lowered between the fender and the frame, the fork drawn out and drawn back by a guy line attached to it, hooked into a second bundle while the attendant is spreading the one delivered. This operation is repeated until the stack is completed. The use of the fender may be dispensed with while the stack is low, but it is required after the stack is raised a few feet to protect both the stack and the bundles. When a cart is to be loaded either with hay or straw it is driven between the frame and fender, (the machine being located within reach of a stack or mow of hay or straw), the fork is hooked into a mass of hay or straw which is then raised by the horse, and drawn by the attendant to the cart by means of a guy line, and when in the right position is drawn out by the attendant on the mow by means of a second guy line. Thus the cart is loaded or unloaded.

With this machine the ease and rapidity with which large quantities of hay or straw can be moved is vastly increased, consequently the expense of handling these bulky materials is greatly diminished. The comparative small cost of this machine, its simplicity, and its almost universal adaptation for all situations on a farm in which not only hay and straw, but other materials are to be loaded or unloaded from carts, or formed in stacks or piles, gives to it great advantage over the more complicated and expensive elevators that have heretofore been used.

I do not confine myself to the precise method as described of connecting the fender, as many other equivalent ways can be used to accomplish the same objects.

Having thus described my inprovements in hay and stray elevators, what I claim therein as new and desire to secure by Letters Patent is—

1. The combination of the inclined hoisting boom hinged to the supporting frame with the adjustable fender arranged as described for the purpose set forth.

2. The combination of the hinged forked feet (e) with the sliding section of the fender for the purpose described.

In testimony whereof I have subscribed my name.

JAMES H. GILL.

Witnesses:
 JOHN HOLLINGSHEAD,
 F. SOUTHGATE SMITH.